United States Patent
Shock et al.

(10) Patent No.: US 6,189,376 B1
(45) Date of Patent: *Feb. 20, 2001

(54) TRANSFER CASE CONTROLLER TEST FIXTURE

(75) Inventors: Karl W. Shock; Rick Yohman, both of Madison; Chris Martin, Harvest; Joe R. Morton, Madison, all of AL (US)

(73) Assignee: Chrysler Corporation, Auburn Hills, MI (US)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/928,210

(22) Filed: Sep. 12, 1997

(51) Int. Cl.$^7$ .................................................. G01M 15/00

(52) U.S. Cl. ............................................................ 73/118.1

(58) Field of Search ................................... 73/118.1, 112, 73/116, 117, 117.1, 117.2, 117.3, 119 R

(56) References Cited

U.S. PATENT DOCUMENTS

| | | | |
|---|---|---|---|
| 4,356,724 | * 11/1982 | Ayoub et al. | 73/118.1 |
| 4,381,828 | 5/1983 | Lunn et al. . | |
| 4,452,331 | 6/1984 | Lunn et al. . | |
| 4,489,597 | * 12/1984 | Davison, Jr. | 73/118.1 |
| 4,520,659 | * 6/1985 | Lucia et al. | 73/118.1 |
| 4,592,228 | * 6/1986 | Lucia | 73/118.1 |
| 4,920,788 | * 5/1990 | Ando et al. | 73/118.1 |
| 5,537,865 | * 7/1996 | Shultz | 73/118.1 |

* cited by examiner

*Primary Examiner*—Eric S. McCall
(74) *Attorney, Agent, or Firm*—Roland A. Fuller, III

(57) ABSTRACT

A text fixture for testing a transfer case electronic control unit according to this invention comprises an eletromechanical shift mechanism having electronic inputs and outputs for coupling to electronic inputs and outputs output of the transfer case electronic control unit and an output shaft coupled to a transfer case load simulator. In a preferred embodiment, the transfer case load simulator comprises first and second oppositely wound torsion springs having identical torque characteristics coupled in opposed relation to the output shaft of the eletro-mechanical shift mechanism.

5 Claims, 2 Drawing Sheets

TRANSFER CASE CONTROLLER TEST FIXTURE

BACKGROUND

This invention relates to testing of electronic transfer case controllers, and more particularly, to a text fixture for use in testing electronic transfer case controllers.

Transfer cases, as is known, are used in four wheel drive vehicles to distribute power from the transmission to the four wheels. One conventional type of transfer case provides for four-wheel drive, where engine power is transferred to the front and rear axles of the vehicle, two-wheel drive, where engine power is transferred to the main driving axle of the vehicle, and neutral. Such a transfer case requires a shift mechanism to shift the transfer case between the four-wheel drive, two-wheel drive, and neutral positions.

Although mechanically actuated shift mechanisms have most commonly been used to shift such transfer cases, more recently, such transfer cases have been provided with eletro-mechanical shift mechanisms that are electronically controlled. In such an arrangement, an electronic control unit energizes a shift motor mechanism, typically consisting of a shift motor and gear train, which shifts the transfer case to the selected position (four-wheel drive, two-wheel drive or neutral).

As is known, it is desirable, sometimes necessary, to be able to test the operation of the electronic control unit without it being installed in a vehicle. However, to do so has typically required that the electronic control unit for the transfer case be connected to the eletro-mechanical shift mechanism and the eletro-mechanical shift mechanism be connected to the transfer case. The transfer case is, however, relatively large, bulky and heavy, making setting up a test stand for testing the transfer case electronic control unit a cumbersome process.

It is an objective of this invention to eliminate the disadvantages caused by using the transfer case in testing the transfer case electronic control unit by providing a device that simulates the characteristics of the transfer case needed to test the transfer case electronic control unit.

SUMMARY OF THE INVENTION

A text fixture for testing a transfer case electronic control unit according to this invention comprises an eletro-mechanical shift mechanism having an electronic input for coupling to an electronic output of the transfer case electronic control unit and an output shaft coupled to a transfer case load simulator. In a preferred embodiment, the transfer case load simulator comprises first and second oppositely wound torsion springs having identical torque characteristics coupled in opposed relation to the output shaft of the eletro-mechanical shift mechanism.

BRIEF DESCRIPTION OF THE DRAWINGS

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which.

DETAILED DESCRIPTION

Figure 1:
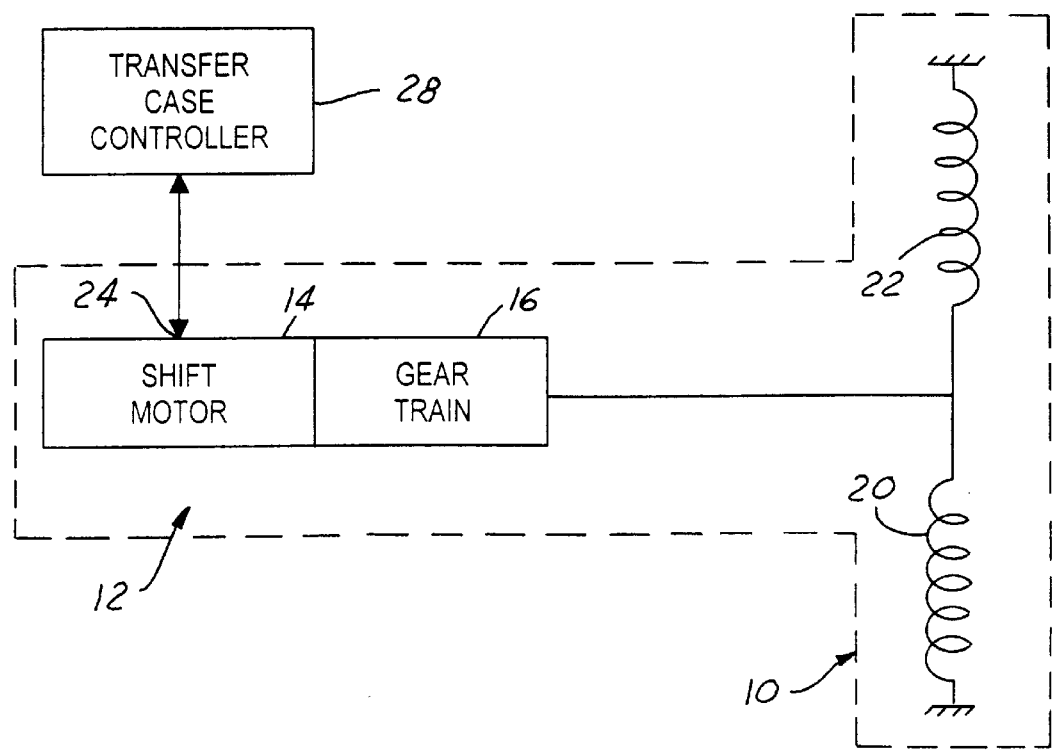
FIG. 1 is a schematic of a text fixture according to this invention coupled to a transfer case electronic control unit.

Referring to Figures, a test fixture 10 according to this invention includes an eletro-mechanical transfer case shift mechanism 12 coupled to torsion springs 20, 22. Preferably, eletro-mechanical shift mechanism 12 is the eletro-mechanical shift mechanism used to shift the transfer case with which the electronic transfer case controller 28 being tested is used and includes shift motor 14 and gear train 16. Gear train 16 has an output shaft 18 that is coupled to torsion springs 20, 22. Shift motor 14 has electronic inputs and outputs 24 for coupling to electronic inputs and outputs 26 of electronic transfer case controller 28, illustratively by a cable 30. In the embodiment shown in the figures, torsion springs 20, 22 are oppositely wound torsion springs and output shaft 18 of gear train 16 is coupled to torsion springs 20, 22 such that torsion springs 20 and 22 are in opposed relation to each other. That is, when output shaft 16 turns in one direction, one of springs 20, 22 will wind tighter and the other will unwind. In this regard, oppositely wound torsion springs 20, 22 illustratively have identical torque characteristics selected to mirror the shift torque of the transfer case.

Figure 3:
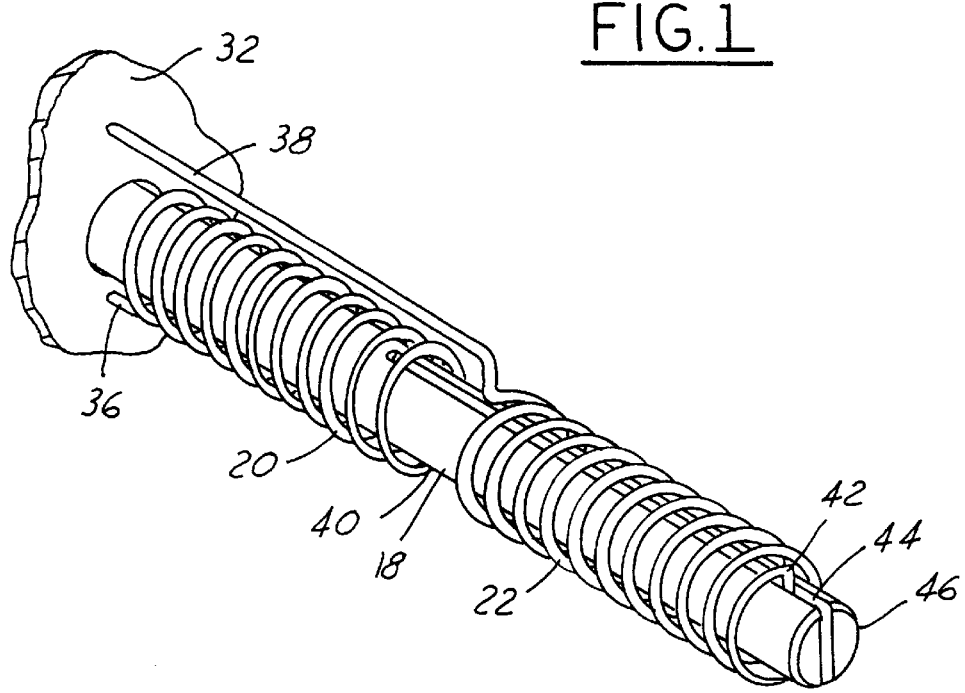
FIG. 3 is a perspective view of the torsion springs attached to the housing of the text fixture according to this invention.
Figure 2:
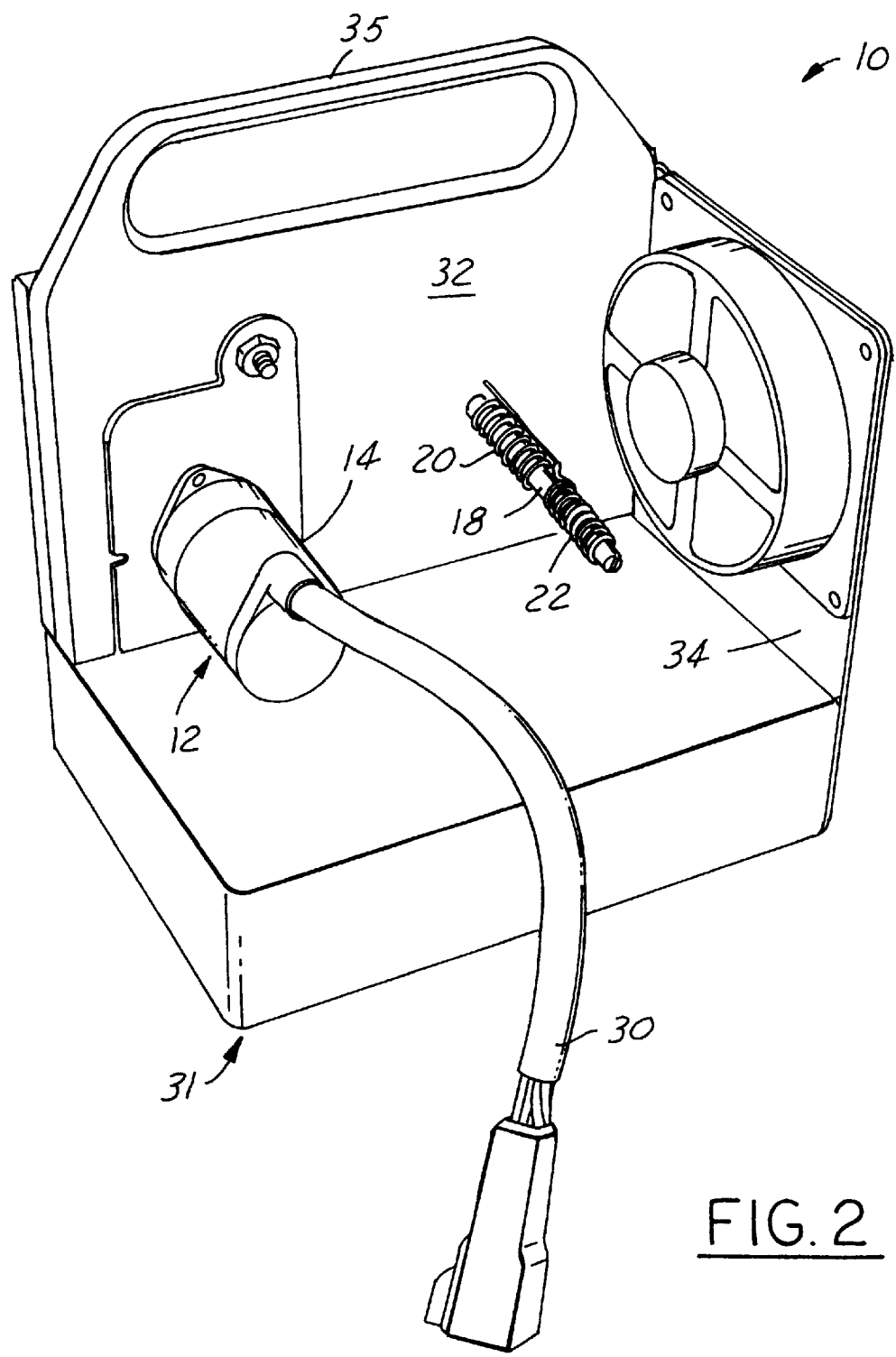
FIG. 2 is a perspective view of the interior of a text fixture according to this invention.

Referring to FIGS. 2 and 3, test fixture 10 further includes a housing 31 having adjacent sidewalls 32, 34. Electro-mechanical shifter 12 is mounted on sidewall 32 such that shift motor 14 is inside housing 30 and gear train 16 is on the outer surface of sidewall 32 with output shaft 18 extending through sidewall 32 and into the inside of housing 30 where it connects with torsion springs 20, 22, which are mounted to sidewall 32 by respective first ends 36, 38 inside housing 30. Torsions springs 20, 22 have respective second ends 40, 42 which are received in a slot 44 in a distal end 46 of output shaft 18 of gear train 16. A cooling fan is mounted to the inside of sidewall 34.

Torsion springs 20, 22 provide a torque load on output shaft 18 of gear train 16 that is comparable to the shift torque loaded on output shaft 18 by the transfer case with which electronic transfer case controller 28 is used. In testing electronic transfer case controller 28, electronic transfer case controller 28 energizes shift motor 14 of eletro-mechanical shifter 12 to rotate in clockwise and counter-clockwise shift directions, which causes comparable rotation of output shaft 18 of gear train 16. As shaft 18 rotates in one direction, it will cause one of torsion springs 20, 22 to tighten and the other to unwind, which puts a shift torque load on eletro-mechanical shifter 12 analogous to the shift torque load put on it by the transfer case when electro mechanical shifter 12 shifts the transfer case. When shaft 18 rotates in the other direction, the other of torsion springs 20, 22 will tighten and the first spring will unwind, again loading the output shaft 18 of electro-mechanical shifter 12. By using two oppositely wound torsion springs 20, 22 having identical torque characteristics coupled to output shaft 18 in opposed relation, the same amount of torque is loaded on output shaft 18 regardless of the direction of rotation of output shaft 18.

In contrast to transfer cases, which often weigh over seventy-five pounds, test fixture 10 is relatively light, weighing less than twenty-five pounds. Text fixture 10 is also much more compact than transfer cases. In a preferred embodiment, housing 31 illustratively has dimensions of 6.3×7.8×7.5 inches. Test fixture 10 is thus easily portable and well suited for bench-top testing of transfer case controllers. In this regard, housing 30 is preferably provided with a handle 35 to facilitate carrying test fixture 10 around.

Although the invention has been described in detail with reference to certain preferred embodiments and specific examples, variations and modifications exist within the scope and spirit of the invention as defined in the following claims.

What is claimed is:

1. A test fixture for use in testing an electronic controller for an electro-mechanically shifted transfer case, the test fixture comprising a housing, an electro-mechanical shift mechanism having electrical inputs and outputs for coupling to the electronic controller; at least one torsion spring having a first end coupled to an output shaft of the electro-mechanical shift mechanism and a second end affixed to the housing so that as the output shaft of the electro-mechanical shift mechanism rotates, the torsion spring winds and applies a load to the output shaft of the electro-mechanical shift mechanism, wherein, in testing the electronic controller, the electrical inputs and outputs of the electro-mechanical shift mechanism are coupled to the electronic controller and the test fixture simulates characteristics of a transfer case that the electronic controller is used to control.

2. A test fixture for use in testing an electronic controller for an eletro-mechanically shifted transfer case, the test fixture comprising an eletro-mechanical shift mechanism having electrical inputs and outputs for coupling to the electronic controller, at least a first torsion spring coupled to an output shaft of the eletro-mechanical shift mechanism, and at least a second torsion spring coupled to the output shaft of the eletro-mechanical shift mechanism in opposed relation to the first torsion spring, wherein, in testing the electronic controller, the electrical inputs and outputs of the eletro-mechanical shift mechanism are coupled to the electronic controller and the test fixture simulates characteristics of a transfer case that the electronic controller is used to control.

3. The test fixture of claim 2 wherein the first and second torsion springs are oppositely wound torsion springs having identical torque characteristics.

4. A test fixture for use in testing an electronic controller for an eletro-mechanically shifted transfer case, the text fixture comprising a housing; an eletro-mechanical shift mechanism mounted to the housing, the eletro-mechanical shift mechanism having electrical inputs and outputs for coupling to the electronic controller and an output shaft; first and second oppositely wound torsion springs mounted to the output shaft in opposed relation to each other, the first and second torsion springs also mounted to the housing, wherein, in testing the electronic controller, the electrical inputs and outputs of the eletro-mechanical shift mechanism are coupled to the electronic controller and the test fixture simulates characteristics of a transfer case that the electronic controller is used to control.

5. The test fixture of claim 4 wherein the first and second torsion springs have identical torque characteristics that mirror a shift torque load put on the electro-mechanical shift mechanism by the transfer case.

* * * * *